Dec. 6, 1949     L. C. CLAITOR ET AL     2,490,114
POWER ABSORBING APPARATUS
Filed Nov. 12, 1947
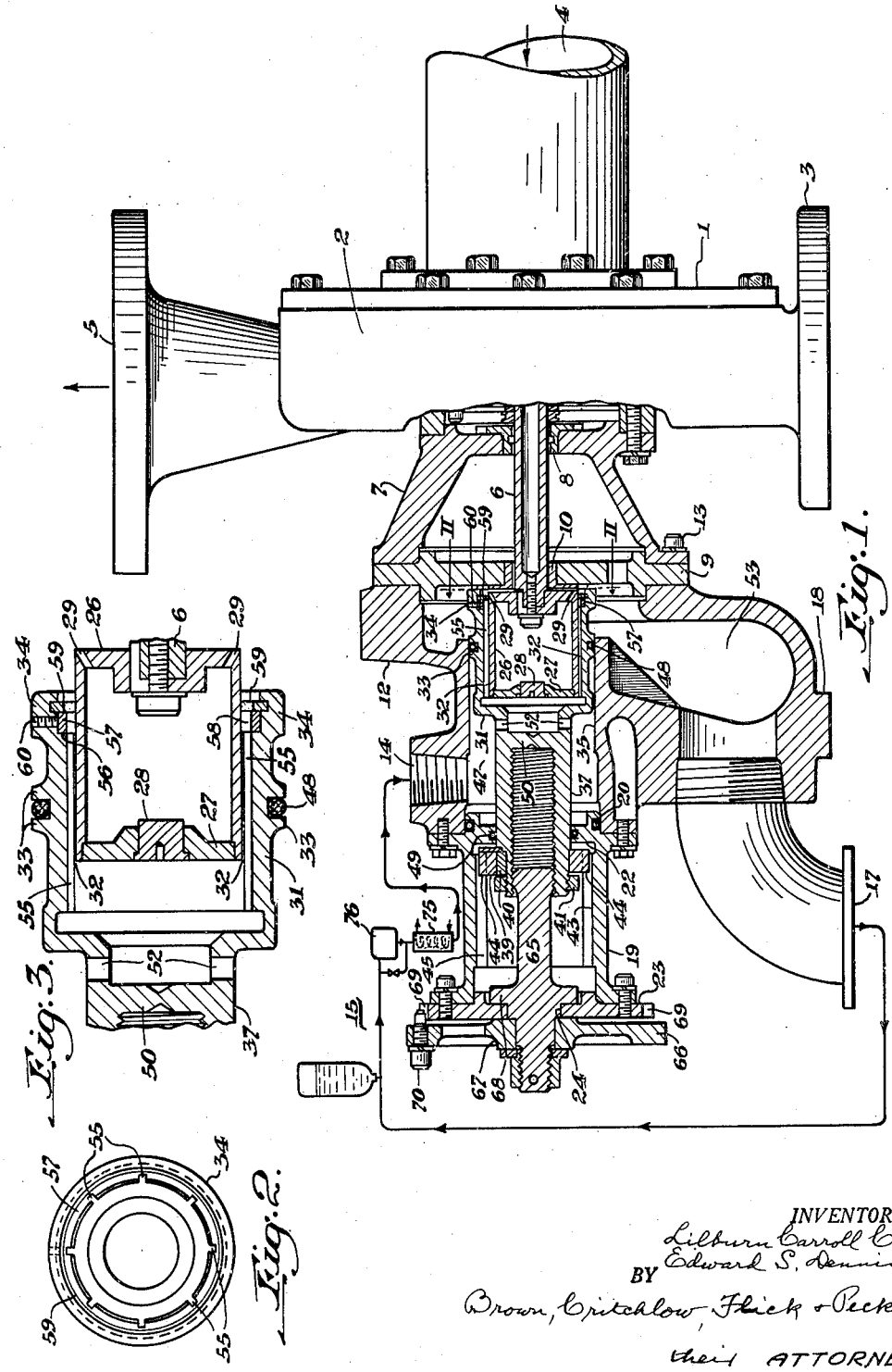
INVENTORS
Lilburn Carroll Claitor
Edward S. Dennison
BY
Brown, Critchlow, Flick & Peckham
their ATTORNEYS.

Patented Dec. 6, 1949

2,490,114

UNITED STATES PATENT OFFICE 2,490,114

POWER ABSORBING APPARATUS

Lilburn Carroll Claitor, Jeannette, and Edward Stanford Dennison, Hempfield Township, Westmoreland County, Pa., assignors to Elliott Company, Jeannette, Pa., a corporation of Pennsylvania Application November 12, 1947, Serial No. 785,250

11 Claims. (Cl. 188—90)

1

This invention relates to brakes, and more particularly to liquid friction brakes that are especially suitable as power absorption, or loading, devices for members rotating at exceedingly high speeds.

The invention is particularly useful as a power absorption device for expansion turbines in a gas separation plant, where gases are cooled to low temperatures by expanding them in a turbine with the performance of external work. In such turbines, the angular velocity of the turbine wheel may be as high as 60,000 or more revolutions per minute, a speed too great for conventional braking or power absorption apparatus.

It is among the objects of this invention to provide a liquid friction brake in which an effective and uniform load can be applied to a rotating member having an exceedingly high angular velocity, in which the load may be easily and gradually varied within wide limits, and in which the construction is simple and durable.

In accordance with this invention, two members of circular cross section are disposed concentrically in telescoping relation. One of these members is non-rotatable, while the other is coaxially mounted on the shaft of a rotatable member from which power is to be absorbed by loading. The two members have a slight radial clearance between their opposing surfaces that forms an annular passage between them. One end of this annular passage communicates with a source of flowing liquid, which flows through and fills the passage to exert a frictional braking force, or load, on the rotatable member. Since this braking force is proportional to the length of the annular passage filled by the liquid, one of the members is provided with means for adjusting it axially of the other to change the length of this passage and thus vary the braking force. Although the two members may be conical, for best results it is preferred to make them cylindrical.

The preferred embodiment of this invention is illustrated in association with an expansion turbine in the accompanying drawings, of which Fig. 1 is a vertical longitudinal section of the brake, showing the liquid source and associated parts of the liquid supply system diagrammatically and showing the expansion turbine in elevation; Fig. 2 is an end view of the outer braking cylinder along the line II—II in Fig. 1, and Fig. 3 is an enlarged longitudinal vertical section of the braking cylinders, showing the cylinders in partial telescoping position.

Referring to the drawings, an expansion tur-

2 bine 1, for cooling a gas by expanding it with the performance of external work, has a housing 2, provided with a base 3, a gas inlet 4, and a gas outlet 5. A shaft 6, on which the turbine wheel is mounted, projects from the turbine housing opposite the gas inlet 4. Bolted to the shaft side of the turbine housing is a shaft housing 7, provided with a bearing 8 for that portion of the shaft immediately adjacent to the turbine. On the other end of the shaft housing is mounted a bearing plate 9, having a bearing 10 for the end of the shaft. The bearing plate is secured between the shaft housing and a brake housing 12 by circumferentially spaced bolts 13, which unite the two housings.

The brake housing is provided with a liquid inlet 14 connected to a liquid supply system, designated generally as 15 and shown diagrammatically in Fig. 1 of the drawings, and with a liquid outlet 17, which is also connected to the liquid supply system forming a closed circuit for the braking liquid. The brake housing has a base 18 adapted to be rigidly supported, as is the base of the turbine, by a foundation or bed plate not shown in the drawings. On the end of the brake housing remote from the shaft housing is bolted a regulator housing 19, the joint between the two housings being provided with a packing ring 20. The interiors of these two housings communicate through the inwardly projecting circular flange 22 in the regulator housing. On the other end of the regulator housing is mounted an end plate 23 having a central opening 24 therein.

On the end of the turbine shaft 6 projecting through the bearing 8 is mounted a cylinder 26, which is concentric with the shaft and rotatable with it. Because the shaft and cylinder may rotate at exceedingly high speeds (around 60,000 R. P. M. or higher) when the turbine is in operation, the cylinder is preferably hollow to make it as light in weight as possible. Its inner and outer cylindrical surfaces are carefully machined until they are concentric with the shaft and with each other within very small limits of tolerance. The open end of the cylinder, i. e. the end remote from the shaft, is closed by a disc 27 having a central plug 28. Since this cylinder will be surrounded by a braking liquid under pressure and since this liquid may leak inside of the cylinder around the plug 28, the other end of the cylinder is provided with diametrically opposed holes 29, through which any leaking liquid will be discharged by centrifugal force when the cylinder is rotating at high speed. The assembled cylinder and shaft are dynamically balanced to minimize vibration of and stresses in these parts when rotated at high speeds.

Slidably mounted in the brake housing is a second cylinder 31, which is telescoped over the rotatable cylinder 26 but is radially spaced from the latter a slight amount to form an annular passage 32 between the opposing cylindrical surfaces. Encircling the outer cylinder 31, and preferably integral with it, are two flanges 33 and 34, which are adapted to slidably engage the inner cylindrical wall 35 of the brake housing.

Projecting from the inner end of the outer cylinder and communicating with the interior of that cylinder is a sleeve 37, which is slidably supported by the flange 22 in the regulator housing 19. On the end of the sleeve remote from the outer cylinder is mounted a collar 39, which is rigidly attached to the sleeve by a key 40 and a lock nut 41. The collar slidably engages the inner cylindrical wall 43 of the regulator housing. Extending outward from opposite sides of the collar are two tongues 44, which slidably engage longitudinal grooves 45 in the housing wall. This arrangement prevents rotation of the sleeve and outer cylinder relative to the brake and regulator housings. By placing this non-rotatable cylinder outside, instead of inside, the rotatable cylinder, both ends of the former can be supported.

The sleeve 37 has a smaller external diameter than the outer cylinder 31, to provide an inlet chamber 47 between the sleeve and the adjacent walls of the brake housing. This chamber communicates with the liquid inlet 14 and is filled by the braking liquid under pressure. To prevent this liquid from leaking around the outside of the outer cylinder, the flange 33 on that cylinder is provided with a packing ring 48. Likewise, to prevent this liquid from leaking into the regulator housing, the flange 22 in that housing is also provided with a packing ring 49, which bears on the sleeve 37.

Inside the sleeve and adjacent to the outer cylinder is a transverse partition 50. Between this partition and the outer cylinder, the sleeve is provided with two diametrically opposed holes 52, which permit liquid to flow from the inlet chamber 47 into the interior of the outer cylinder, from where it flows through and fills the annular passage 32 between the telescoping cylinders. The braking liquid is discharged from this annular passage into a discharge chamber 53, from which it flows to the liquid outlet 17. The outer cylinder and the sleeve are so mounted in the brake and regulator housings that, when the cylinder is in its extreme position remote from the regulator housing, as shown in Fig. 1, there is clearance between the ends of the two cylinders 26 and 31 to permit liquid to flow from the interior of the outer cylinder 31 into the annular passage 32. Similar clearance under the same conditions is provided between the end of the outer cylinder 31 and the bearing plate 9 to permit liquid to flow from the annular passage 32 into the discharge chamber 53.

In order to distribute the braking liquid as uniformly as possible to the annular passage 32 between the cylinders, as well as to regulate the rate at which the liquid is circulated through the brake, the inner surface of the outer cylinder is preferably provided with a plurality of circumferentially spaced grooves 55 extending lengthwise of the cylinder and terminating near its outer end (the end adjacent to the bearing plate 9) in a counterbore 56, the side of which is recessed below the bottoms of the grooves. The grooves also serve to allow sufficient braking liquid to flow between the cylinders to remove the heat that is generated in the brake. The grooves 55 are formed in the non-rotatable cylinder because it is not subjected to the stresses of the rotating cylinder. Adjustably mounted in the counterbore is a ring 57, the inner edge of which is substantially flush with the inner cylindrical surface of the outer cylinder. The inner edge of the ring is provided with notches 58 corresponding in size and spacing to the adjacent ends of the grooves. The ring is held in place within the counterbore by a snap ring 59 and by a set screw 60 threaded in the wall of the outer cylinder. By rotating the ring 57, the notches therein can be aligned with the grooves 55, or those grooves can be partially or wholly occluded by the unnotched portions of the ring. In this way, the rate of flow of braking liquid between the telescoping cylinders can be varied within desired limits. Regardless, however, of the position of the notches 58 relative to the grooves 55 in the outer cylinder, braking liquid will always flow from those grooves into the annular passage 32 between the cylinders and will fill that passage uniformly so as to exert a braking force upon the inner, or rotatable, cylinder 26.

The end of the sleeve 37 remote from the outer cylinder is internally threaded to engage corresponding threads on the end of a regulator screw 65. On the other end of this screw projecting through the central opening 24 in the end plate 23 is mounted a hand wheel 66 for turning the screw. Axial movement of the regulator screw in the regulator housing is prevented by hub 67 of the hand wheel and shoulder 68 integral with the screw, bearing against the outside and the inside, respectively, of the end plate. As a result, when the hand wheel is rotated the threads on the regulator screw, which engage corresponding threads inside the sleeve 37, cause the sleeve and the outer cylinder 31 to move axially in their respective housings. Such movement increases or decreases the length of the annular passage 32 between the telescoping cylinders and correspondingly increases or decreases the amount of braking fluid in mutual contact with their opposing cylindrical surfaces. In order to lock the hand wheel in any desired position, the end plate 23 on the regulator housing is provided with a plurality of circumferentially spaced notches 69 around its periphery, and these notches are adapted to be engaged by a locking screw 70 in the hand wheel.

In order to develop maximum efficiency from an expansion turbine of the type herein described, the normal operating speed of the turbine wheel under load will generally be around 50,000 to 60,000 R. P. M. The load or braking force provided by this invention is obtained by friction between the braking liquid in the annular passage and the adjacent surfaces of the two cylinders, and also by internal friction in the liquid itself within this passage. Even though the coefficients of friction involved are very small, the speed of the rotatable cylinder 26 is so great that large amounts of heat are generated. For example, it has been found that an expansion turbine having a turbine wheel 2½ inches in diameter, revolving at 60,000 R. P. M., will generate an amount of heat in the braking liquid that is approximately equivalent to 16 H. P. It is for this reason that the braking liquid is continually circulated through the annular passage 32 and that provision is made for adjusting its rate of flow by means of the notched ring 57 mounted in the end of the outer cylinder.

The desired rate of flow of the braking liquid is determined by the desired rise in its temperature and, for a given installation, will not ordinarily require frequent adjustment. The heat carried off by the braking liquid leaving the liquid outlet 17 is removed by a cooler 75 in the liquid supply system, and the cooled liquid is reintroduced into the liquid inlet 14 by a pump 76.

It has been found that the most satisfactory braking liquid for use in this invention is oil having the proper viscosity and other characteristics required by the particular operating conditions. However, other liquids having suitable characteristics may be successfully used.

Since the shaft 6 and the rotatable cylinder 26 revolve at very high speeds when the turbine is in operation, it is important that no external forces disturb their dynamic balance. If the clearance between the telescoping cylinders is too great, there will be a tendency for the braking liquid in the annular passage between the cylinders to "whip," that is, to distribute itself eccentrically therein, giving rise to lateral forces on the rotatable cylinder that may cause it to vibrate undesirably. It has been found that a radial clearance around 0.003 inch between the two cylinders results in smooth braking action without vibration in the brake and associated expansion turbine of the size and speed previously referred to.

It is a feature of this invention that the braking force or load applied to the rotatable cylinder 26 may be varied within wide limits by rotating the hand wheel 67, thereby moving the outer cylinder 31 axially of the rotatable cylinder and increasing or decreasing the length of the annular passage 32 between their opposing cylindrical surfaces. When the two cylinders are drawn apart by rotation of the hand wheel so that the annular passage between them is quite short, the braking force exerted on the rotating cylinder is comparatively small. It is increased to a maximum by turning the hand wheel until the cylinders overlap to the maximum extent.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A power absorbing liquid friction brake comprising a rotatable shaft, a circular braking member coaxially mounted on the shaft and rotatable with it, a non-rotatable circular braking member mounted in telescoping relation to the rotatable member with a slight clearance between their opposing surfaces forming an annular passage an inlet at one end of the passage for admitting thereto a continually flowing liquid, an outlet at the other end of the passage for discharging said liquid therefrom, whereby the liquid will continually flow through and fill said passage to exert a frictional braking force on the rotatable member, and a manually operable member for adjusting one of said braking members axially of the other to change the length of said passage to vary said braking force.

2. A power absorbing liquid friction brake comprising a rotatable shaft, a cylinder coaxially mounted on the shaft and rotatable with it, a non-rotatable cylinder mounted in telescoping relation to and outside of the rotatable cylinder and spaced radially from it to form an annular passage between their opposing cylindrical surfaces, a source of continually flowing liquid communicating with each end of the passage, whereby liquid will flow through and fill the passage and will exert a frictional braking force on the rotatable cylinder, and a manually operable member for adjusting the non-rotatable cylinder axially of the rotatable cylinder to change the length of said passage to vary said braking force.

3. A power absorbing liquid friction brake comprising a rotatable shaft, a cylinder coaxially mounted on the shaft and rotatable with it, a non-rotatable cylinder mounted in telescoping relation to the outside of the rotatable cylinder and spaced radially from it to form an annular passage between their opposing cylindrical surfaces, the inner cylindrical surface of the outer cylinder being provided with a plurality of spaced grooves parallel to the axis of the cylinder, an inlet at one end of said annular passage, an outlet at the other end of said annular passage a source of continually flowing liquid communicating with said inlet and outlet, whereby liquid will flow into and fill the grooves in that cylinder and be uniformly distributed to and fill said annular passage to exert a frictional braking force on the inner rotatable cylinder, and a manually operable member connected to the outer cylinder for adjusting it axially of the inner cylinder to change the length of said passage to vary said braking force.

4. A power absorbing liquid friction brake comprising a housing, a rotatable shaft mounted in one end of the housing, a cylinder inside the housing coaxially mounted on the shaft and rotatable with it, a non-rotatable cylinder slidably mounted in the housing in telescoping relation to and outside of the rotatable cylinder and spaced radially from it to form an annular passage between their opposing cylindrical surfaces, a source of continually flowing liquid, an inlet chamber in the housing communicating with said source and with the interior of the non-rotatable cylinder, an outlet chamber in the housing communicating with said source and with the interior of the non-rotatable cylinder, whereby liquid will flow into and fill said passage between the telescoping cylinders to exert a frictional braking force on the rotatable cylinder, and a manually operable adjusting member mounted in the end of the housing remote from the rotatable shaft and connected to the non-rotatable cylinder for adjusting that cylinder axially of the rotatable cylinder so as to change the length of said passage to vary said braking force.

5. A power absorbing device comprising a housing, a rotatable shaft, from which power is to be absorbed, mounted in one end of the housing, a cylinder inside the housing coaxially mounted on the shaft and rotatable with it, a non-rotatable cylinder slidably mounted in the housing in telescoping relation to and outside of the rotatable cylinder and spaced radially from it to form an annular passage between their opposing cylindrical surfaces, the inner cylindrical surface of the outer cylinder having a plurality of spaced grooves parallel to the axis of the cylinder, a source of continually flowing liquid, an inlet chamber in the housing communicating with said source and with the interior of the outer cylinder at one end thereof, an outlet chamber in the housing communicating with said source and with the interior of the outer cylinder at the other end thereof, whereby liquid will flow into and fill said grooves and said annular passage between the cylinders to exert a frictional braking force on the rotatable cylinder, a liquid discharge chamber in the housing communicating with the annular passage for receiving liquid discharged therefrom, and a manually operable adjusting member mounted in the end of the housing remote from the shaft and connected to the outer cylinder for adjusting that cylinder axially of the inner cylinder to change the length of the annular passage to vary said braking force.

6. A power absorbing device comprising a housing, a rotatable shaft, from which power is to be absorbed, mounted in one end of the housing, a cylinder inside the housing coaxially mounted on the shaft and rotatable with it, a non-rotatable cylinder slidably mounted in the housing in telescoping relation to and outside of the rotatable cylinder and spaced radially from it to form an annular passage between their opposing cylindrical surfaces, the inner cylindrical surface of the outer cylinder having a plurality of spaced parallel grooves extending lengthwise of the cylinder and terminating in a counterbore in the end of the cylinder adjacent to the shaft, a source of continually flowing liquid, an inlet chamber in the housing communicating with said source and with the interior of the outer cylinder, whereby liquid will flow into and fill the grooves in the outer cylinder and the annular passage between the cylinders to exert a frictional braking force on the rotatable cylinder, a ring mounted in the counterbore in the end of the outer cylinder and having around its inner periphery a plurality of notches having the same cross-section and being spaced from each other the same distance as the adjacent ends of said grooves, the ring being rotatably adjustable in the counterbore to regulate the flow of liquid discharged from said grooves, a liquid discharge chamber in the housing communicating with said annular passage and with the notches in said ring for receiving liquid flowing from between the telescoping cylinders, and a manually operable adjusting member mounted in the end of the housing remote from the shaft and connected to the outer cylinder for adjusting that cylinder axially of the rotatable cylinder to change the length of said annular passage to vary said braking force.

7. A power absorbing device comprising a housing, a rotatable shaft, from which power is to be absorbed, mounted in one end of the housing, a cylinder inside the housing coaxially mounted on the shaft and rotatable with it, a non-rotatable cylinder slidably mounted in the housing in telescoping relation to and outside of the rotatable cylinder and spaced radially from it to form an annular passage between their opposing cylindrical surfaces, the inner cylindrical surface of the non-rotatable cylinder having a plurality of spaced parallel grooves extending lengthwise of the cylinder and terminating in a counterbore in the end of the cylinder adjacent to the shaft, the non-rotatable cylinder dividing the housing into a liquid inlet chamber communicating with one end of said annular passage and a liquid discharge chamber communicating with the other end of said annular passage, a source of continually flowing liquid connected to the liquid inlet chamber, whereby liquid will flow into and fill said grooves and said annular passage between the cylinders to exert a frictional braking force on the rotatable cylinder and will be discharged from said passage into the liquid discharge chamber, a ring mounted in said counterbore in the end of the non-rotatable cylinder and having around its inner periphery a plurality of notches having the same cross-section and being spaced from each other the same distance as the adjacent ends of said grooves, the ring being rotatably adjustable in the counterbore to regulate the flow of liquid discharged from said grooves, and a manually operable adjusting member mounted in the end of the housing remote from the shaft and connected to the non-rotatable cylinder for adjusting that cylinder axially of the rotatable cylinder to change the length of said annular passage to vary said braking force.

8. A power absorbing device comprising a housing, a rotatable shaft, from which power is to be absorbed, mounted in one end of the housing, a cylinder inside the housing coaxially mounted on the shaft and rotatable with it, a non-rotatable cylinder slidably mounted in the housing in telescoping relation to and outside of the rotatable cylinder and spaced radially from it to form an annular passage between their opposing cylindrical surfaces, the outer cylinder having its inner surface provided with a plurality of spaced parallel grooves extending lengthwise of the cylinder and terminating in a counterbore in that end of the cylinder adjacent to the shaft, a sleeve mounted in the other end of the housing opposite the shaft, one end of the sleeve being connected to one end of the outer cylinder and communicating with the interior of that cylinder and the other end of the sleeve being internally threaded, a liquid inlet chamber in the housing communicating through holes in the sleeve with the interior of the outer cylinder, a source of continually flowing liquid connected to the inlet chamber, whereby liquid will flow into and fill said grooves inside the outer cylinder and will fill said annular passage between the cylinders to exert a frictional braking force on the inner rotatable cylinder, a ring mounted in said counterbore in the end of the non-rotatable cylinder and having around its inner periphery a plurality of notches having the same cross-section and being spaced from each other the same distance as the adjacent ends of said grooves, the ring being rotatably adjustable in the counterbore to regulate the flow of liquid discharged from said grooves, a liquid discharge chamber in the housing communicating with said annular passage and with the notches in said ring for receiving liquid flowing therefrom, and a manually operable adjusting screw mounted outside of the housing and provided with external threads engaging corresponding threads in the end of the sleeve for adjusting the outer cylinder axially of the inner cylinder to change the length of said annular passage to vary said braking force.

9. A power absorbing device comprising a housing, a rotatable shaft, from which power is to be absorbed, mounted in one end of the housing, a cylinder inside the housing coaxially mounted on the shaft and rotatable with it, a non-rotatable cylinder slidably mounted in the housing in telescoping relation to and outside of the rotatable cylinder and spaced radially from it to form an annular passage between their opposing cylindrical surfaces, the outer cylinder having its inner surface provided with a plurality of spaced parallel grooves extending lengthwise of the cylinder and terminating in a counterbore in that end of the cylinder adjacent to the shaft, a ring mounted in said counterbore in the end of the non-rotatable cylinder and having around its inner periphery a plurality of notches having the same cross-section and being spaced from each other the same distance as the adjacent ends of said grooves, the non-rotatable cylinder dividing the housing into a liquid inlet chamber communicating with one end of said annular passage and a liquid discharge chamber communicating with the other end of said annular passage, a source of liquid, a pump connected to the source and to the inlet chamber, whereby liquid will flow under pressure into the interior of the outer cylinder and will fill said grooves and said annular passage between the cylinders to exert a frictional braking force on the inner rotatable cylinder and will de discharged into the liquid discharge chamber, said ring being rotatably adjustable in the counterbore to regulate the flow of liquid discharged into the discharge chamber, and a manually operable adjusting member mounted in the end of the housing remote from the shaft and connected to the non-rotatable cylinder for adjusting that cylinder axially of the rotatable cylinder to change the length of said annular passage to vary said braking force.

10. A power absorbing device comprising a housing, a rotatable shaft, from which power is to be absorbed, mounted in one end of the housing, a cylinder inside the housing coaxially mounted on the shaft and rotatable with it, a non-rotatable cylinder slidably mounted in the housing in telescoping relation to and outside of the rotatable cylinder and spaced radially from it to form an annular passage between their opposing cylindrical surfaces, the inner cylindrical surface of the outer cylinder having a plurality of spaced parallel grooves extending lengthwise of the cylinder and terminating in a counterbore in that end of the cylinder adjacent to the shaft, the non-rotatable cylinder dividing the housing into a liquid inlet chamber remote from the shaft and a liquid discharge chamber adjacent to the shaft, a sleeve mounted in the other end of the housing opposite the shaft and having one of its ends connected to one end of the outer cylinder and communicating with the interior of that cylinder and having its other end internally threaded, the sleeve being provided with a transverse partition and having a radial opening between the partition and the outer cylinder communicating with the liquid inlet chamber, a source of liquid, a pump connected to the source and to the inlet chamber, whereby liquid will flow under pressure into the interior of the outer cylinder and into said grooves and will fill said annular passage between the cylinders to exert a frictional braking force on the inner rotatable cylinder and will be dischaged into the discharge chamber, a ring mounted in said counterbore in the end of the outer cylinder and having around its inner periphery a plurality of notches having the same cross-section and being spaced from each other the same distance as the adjacent ends of said grooves, the ring being rotatably adjustable in the counterbore to regulate the flow of liquid discharged into the discharge chamber, an adjusting screw rigidly mounted on the outside of the housing, one end of the screw being provided with external threads engaging the corresponding internal threads in the sleeve, a hand-wheel mounted on the other end of the screw for turning the screw to adjust the outer cylinder axially of the inner cylinder to change the length of said annular passage to vary said braking force, and a manually operable member for locking the handwheel in desired positions.

11. A power absorbing device comprising a housing, a bearing in one end of the housing for receiving a rotatable shaft, a circular braking member inside the housing coaxially mounted on the shaft and rotatable with it, a non-rotatable circular braking member slidably mounted in the housing in telescoping relation to and outside of the rotatable member and spaced radially from it to form an annular passage between their opposing surfaces, the inner surface of the outer member having a plurality of spaced grooves extending lengthwise of it and terminating in a counterbore in that end of the outer member adjacent to the shaft, the non-rotatable member dividing the housing into a liquid inlet chamber remote from the shaft and a liquid discharge chamber adjacent to the shaft, a sleeve mounted in the other end of the housing opposite the shaft, and having one of its ends connected to one end of the outer member and communicating with the interior of that member and having its other end internally threaded, the sleeve being provided with a transverse partition and having a radial opening between the partition and the outer member, said opening communicating with the liquid inlet chamber and with the interior of the outer member, a source of liquid, a pump connected to the source and to the inlet chamber, whereby liquid will flow under pressure into the interior of the outer member and into said grooves and will fill said annular passage between the braking members to exert a frictional braking force on the inner rotatable member and will be discharged into the discharge chamber, a conduit connecting the discharge chamber to said liquid source, a ring mounted in said counterbore in the end of the outer member and having around its inner periphery a plurality of notches having the same cross-section and being spaced from each other the same distance as the adjacent ends of said grooves, the ring being rotatably adjustable in the counterbore to regulate the flow of liquid discharged into the discharge chamber, a liquid cooler in one of said conduits, an adjusting screw rigidly mounted on the outside of the housing, one end of the screw being provided with external threads engaging corresponding internal threads in the sleeve, a handwheel mounted on the other end of the screw for turning the screw to adjust the outer braking member axially of the inner member so as to change the length of said annular passage to vary said braking force, and a manually operable member for locking the handwheel in desired positions.

LILBURN CARROLL CLAITOR.
EDWARD STANFORD DENNISON.

REFERENCES CITED

The following references are of record in the file of this patent:

UNITED STATES PATENTS

| Number | Name | Date |
| --- | --- | --- |
| 1,212,311 | Bailey | Jan. 16, 1917 |
| 1,462,141 | Leitch | July 17, 1923 |
| 2,182,076 | Elmer | Dec. 5, 1939 |
| 2,420,360 | Deming | May 13, 1947 |